(12) United States Patent
Zhang et al.

(10) Patent No.: US 8,405,399 B2
(45) Date of Patent: Mar. 26, 2013

(54) METHOD TO PREDICT MIN CELL VOLTAGE FROM DISCRETE MIN CELL VOLTAGE OUTPUT OF STACK HEALTH MONITOR

(75) Inventors: Yanyan Zhang, Victor, NY (US); Sriram Ganapathy, Rochester, NY (US); Kiran Mallavarapu, Johns Creek, GA (US)

(73) Assignee: GM Global Technology Operations LLC, Detroit, MI (US)

( * ) Notice: Subject to any disclaimer, the term of this patent is extended or adjusted under 35 U.S.C. 154(b) by 378 days.

(21) Appl. No.: 12/840,014

(22) Filed: Jul. 20, 2010

(65) Prior Publication Data
US 2012/0019254 A1    Jan. 26, 2012

(51) Int. Cl.
*G01N 27/416* (2006.01)
(52) U.S. Cl. ........................................ 324/433; 324/434
(58) Field of Classification Search .................. 320/107, 320/112, 114, 132, 149; 324/426, 427, 433, 324/434
See application file for complete search history.

(56) References Cited

U.S. PATENT DOCUMENTS

| | | | |
|---|---|---|---|
| 2004/0245100 A1* | 12/2004 | Abouatallah | 204/400 |
| 2008/0182139 A1 | 7/2008 | Ganapathy et al. | |
| 2008/0311449 A1* | 12/2008 | Kaito | 429/22 |
| 2010/0114513 A1* | 5/2010 | Mallavarapu et al. | 702/64 |

OTHER PUBLICATIONS

Zhang et al., U.S. Appl. No. 12/567,381, filed Sep. 25, 2009, entitled "Method to Improve Fuel Cell System Performance Using Cell Voltage Prediction of Fuel Cell Stack".

* cited by examiner

*Primary Examiner* — Edward Tso
(74) *Attorney, Agent, or Firm* — John A. Miller; Miller IP Group, PLC

(57) ABSTRACT

A system for estimating parameters of a fuel cell stack. The system includes a stack health monitor for monitoring minimum cell voltage, stack voltage and current density of the fuel cell stack. The stack health monitor also indicates when a predetermined minimum cell voltage threshold level has been achieved. The system further includes a controller configured to control the fuel cell stack, where the controller determines and records the average fuel cell voltage. The controller generates and stores artificial data points proximate to the one or more predetermined minimum cell voltage threshold levels each time the minimum cell voltage drops below the one or more predetermined minimum cell voltage threshold levels so as to provide an estimation of the fuel cell stack parameters including a minimum cell voltage trend and a minimum cell voltage polarization curve.

20 Claims, 3 Drawing Sheets

METHOD TO PREDICT MIN CELL VOLTAGE FROM DISCRETE MIN CELL VOLTAGE OUTPUT OF STACK HEALTH MONITOR

BACKGROUND OF THE INVENTION

1. Field of the Invention

This invention relates generally to a system and method for predicting the minimum cell voltage trend of fuel cells in a fuel cell stack and, more particularly, to a system and method for predicting the minimum cell voltage trend of fuel cells in a fuel cell stack using a discrete minimum cell voltage output from a stack health monitor.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The stack controller needs to know the current/voltage relationship, referred to as a polarization curve, of the fuel cell stack to provide a proper distribution of power from the stack. The relationship between the voltage and the current of the stack is typically difficult to define because it is non-linear, and changes depending on many variables, including stack temperature, stack partial pressures and cathode and anode stoichiometries. Additionally, the relationship between the stack current and voltage changes as the stack degrades over time. Particularly, an older stack will have lower cell voltages, and will need to provide more current to meet the power demands than a new, non-degraded stack. Fortunately, many fuel cell systems, once they are above a certain temperature, tend to have repeatable operating conditions at a given current density. In those instances, the voltage can be approximately described as a function of stack current density and age.

The minimum cell voltage of the fuel cells in a fuel cell stack is a very important parameter for monitoring the stack health and protecting the stack from reverse voltage damage. In addition, the minimum cell voltage is used for many purposes for controlling the fuel cell stack, such as power limitation algorithms, anode nitrogen bleeding, diagnostic functions, etc. However, the cost of known cell voltage monitors that employ a continuous minimum cell voltage output and have a 0.5 mV resolution is extremely high. Therefore, there is a need in the art for determining the minimum cell voltage of the fuel cells in a fuel cell stack without requiring the use of costly monitoring components, including the cost associated with recording and storing information provided by the monitoring components at each time step.

SUMMARY OF THE INVENTION

In accordance with the teachings of the present invention, a system for estimating parameters of a fuel cell stack is disclosed. The system includes a stack health monitor for monitoring minimum cell voltage, stack voltage and current density of the fuel cell stack. The stack health monitor also indicates when a predetermined minimum cell voltage threshold level has been achieved. The system further includes a controller configured to control the fuel cell stack, where the controller determines and records the average fuel cell voltage. The controller generates and stores artificial data points proximate to the one or more predetermined minimum cell voltage threshold levels each time the minimum cell voltage drops below the one or more predetermined minimum cell voltage threshold levels so as to provide an estimation of the fuel cell stack parameters including a minimum cell voltage trend and a minimum cell voltage polarization curve.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for predicting the minimum cell voltage trend of fuel cells in a fuel cell stack is merely exemplary in nature, and is in no way intended to limit the invention or its applications or uses.

Figure 1:
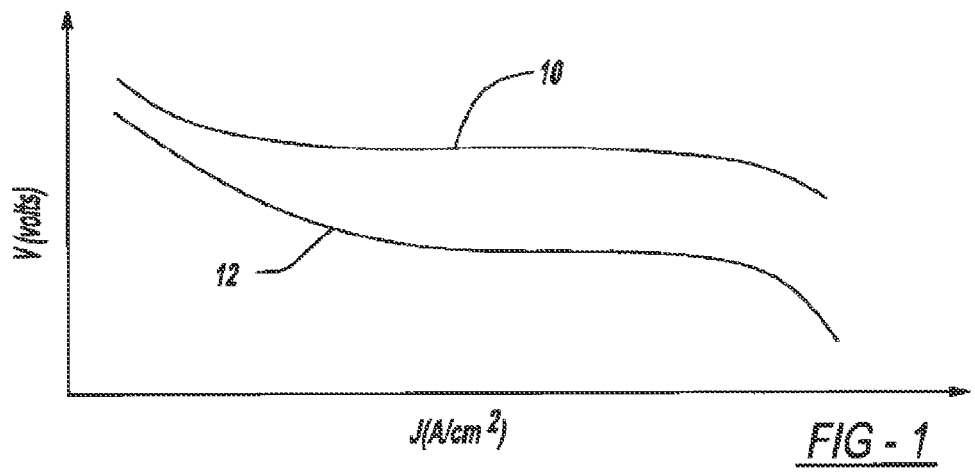
FIG. 1 is a graph with stack current density on the horizontal axis and stack voltage on the vertical axis showing a fuel cell stack polarization curve for a new stack and an older stack.

Many control parameters of a fuel cell system require knowledge of the polarization curve of the fuel cell stack, such as knowing the maximum voltage potential and current draw available from the fuel cell stack. As the stack ages, the stack polarization curve also changes as a result of stack degradation. FIG. 1 is a graph with stack current density on the horizontal axis and average cell voltage on the vertical axis. Graph line 10 is a polarization curve for a new fuel cell stack and graph line 12 is a polarization curve for an aged fuel cell stack, where the average cell voltage is reduced for the same stack current density for the older stack. Therefore, it is necessary to update the polarization curve for the stack so as to accurately determine the various control parameters for efficient fuel cell stack operation.

Figure 2:
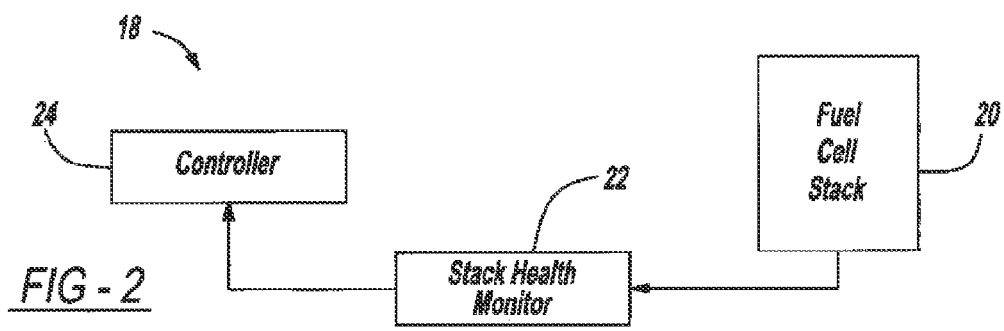
FIG. 2 is a block diagram of a fuel cell system including a fuel cell stack, a stack health monitor and a controller.

FIG. 2 is a block diagram of a fuel cell system 18 that includes a fuel cell stack 20, a stack health monitor 22 and a controller 24. The controller 24 receives data from the stack health monitor 22 and uses the data collected from the stack health monitor 22, such as minimum cell voltage, average cell voltage and current density, and whether one or more cell voltage trigger levels have been achieved, to calculate the minimum cell voltage polarization curve of the stack 20 after at least one minimum cell voltage threshold level trigger has been achieved, as described in detail below. In an alternate embodiment, a separate minimum cell voltage monitoring device may be used to measure minimum cell voltage, while the stack health monitor 22 collects data regarding average cell voltage and current density.

Figure 3:
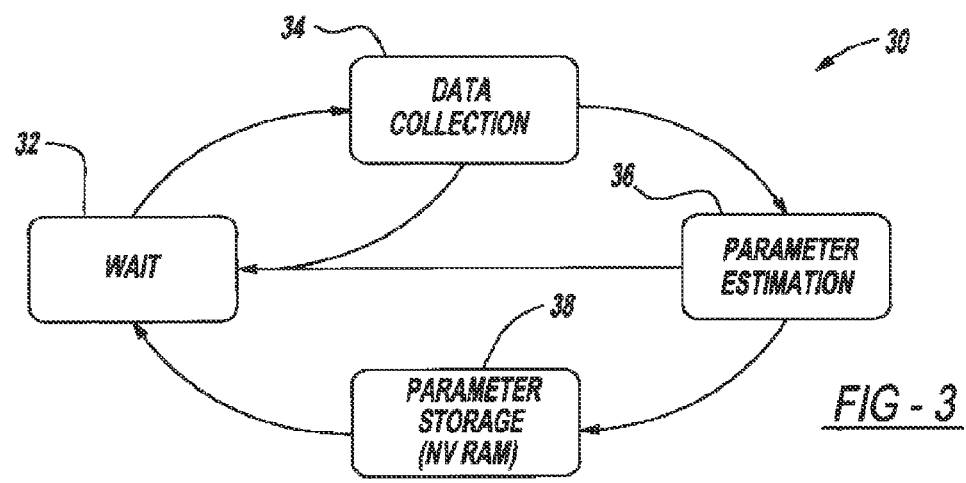
FIG. 3 is a flow chart diagram showing a process for an algorithm that estimates a polarization curve for a fuel cell stack online.

A polarization curve based on the average cell voltage and the stack current density, and a polarization curve based on the minimum cell voltage and stack current density are typically estimated simultaneously. FIG. 3 is a flow chart diagram 30 showing the high-level operation of an algorithm for calculating the polarization curve of the fuel cell stack by the controller 24. At box 32, the algorithm waits for the fuel cell stack 20 to operate and provide power. When the fuel cell stack 20 provides power, the algorithm will not record voltage data for minimum cell voltage at box 34 until a trigger level of minimum cell voltage has been achieved, although minimum cell voltage is continuously monitored, as is discussed in detail below.

In a previously disclosed algorithm for calculating a minimum cell voltage polarization curve, disclosed in U.S. patent application Ser. No. 11/669,898, entitled, "Algorithm for Online Adaptive Polarization Curve Estimation of a Fuel Cell Stack," assigned to the assignee of the present application and incorporated herein by reference, the algorithm utilizes all of the continuous stack current density data and stack voltage data to calculate an average cell voltage and a minimum cell voltage, or may monitor the cell voltage of each fuel cell in the stack to determine average cell voltage and minimum cell voltage. Thus, all of the continuous data is utilized and stored in a memory of a controller, such as the controller 24, which can be costly due to the amount of data that is recorded and stored, as well as the cost associated with the components required to continuously perform these measurements. In addition, dynamic information about average cell voltage and a corresponding polarization curve is not known because the polarization curves are determined after the fuel cell stack has been shutdown.

The algorithm discussed below for determining a minimum cell voltage trend of the fuel cell stack 20 does not record and store all of the continuous minimum cell voltage data inputted before the fuel cell stack 20 is shutdown. Instead, the algorithm utilizes information from the stack health monitor 22, such as minimum cell voltage, average fuel cell voltage and current density, to estimate stack parameters after one or more trigger levels of minimum cell voltage have been achieved, as determined by the stack health monitor. In this way, data regarding minimum cell voltage does not need to be recorded and stored at every time step, thereby reducing the cost associated with recording and storing the data regarding minimum cell voltage. In addition, the algorithm is dynamic, thus reflecting immediate changes in cell voltage and corresponding current density once the trigger level or levels have been achieved. Providing more trigger levels will enable the algorithm to better predict whether or not the fuel cell stack 20 will recover voltage or will continue to drop in voltage, as is discussed in more detail below.

Figure 4:
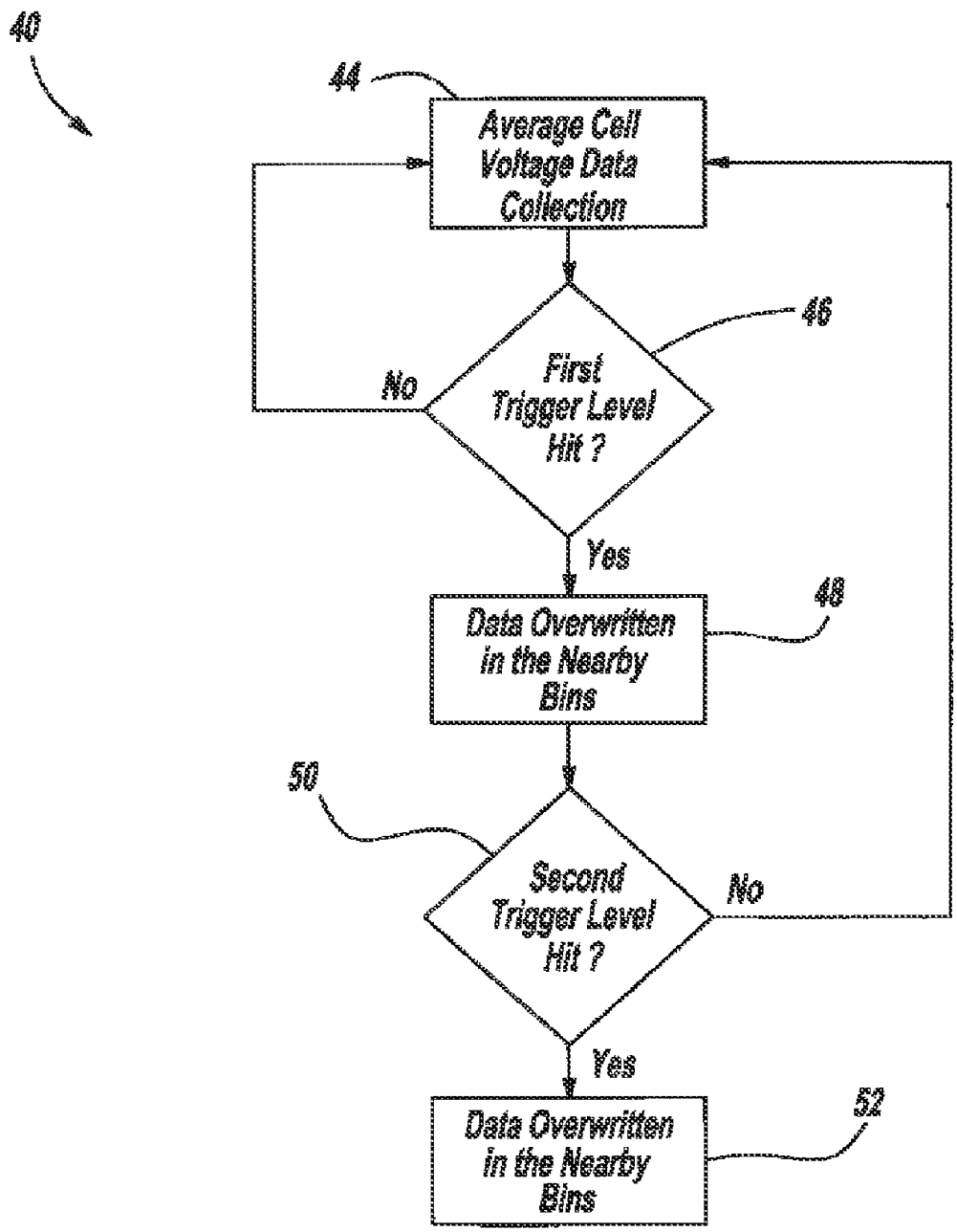
FIG. 4 is a flow chart diagram showing a process for an algorithm that estimates a polarization curve for a fuel cell stack.

FIG. 4 is a flow chart diagram 40 for the algorithm for estimating stack parameters at the box 34 based on average cell voltages and corresponding current density that utilizes two trigger levels of minimum cell voltage, as described in more detail below. As the stack health monitor 22 outputs the information regarding minimum cell voltage, average cell voltage and corresponding current density, and multiple (one or more) discrete levels of the minimum cell voltage for a given current density, the algorithm uses the multiple discrete levels of minimum cell voltage output, in addition to continuous average cell voltage data to predict the minimum cell voltage trend and the minimum cell voltage polarization curve. Continuous average cell voltage and current density data may be provided by the stack health monitor 22, a boost converter, or various other cell voltage measurement devices.

As discussed above, the minimum cell voltage is not recorded at every time-step. Instead, the minimum cell voltage and corresponding current density will only be recorded if one or more predetermined threshold trigger level(s) are achieved. Average cell voltage and current density data are collected by the controller 24 at box 44 and saved into data bins that are divided by current density values, and this begins once the fuel cell system 18 is in a run state. Next, the algorithm determines if a first threshold level trigger for minimum cell voltage has been achieved at decision diamond 46, indicating that a fuel cell in the stack has achieved the threshold level.

Figure 5:
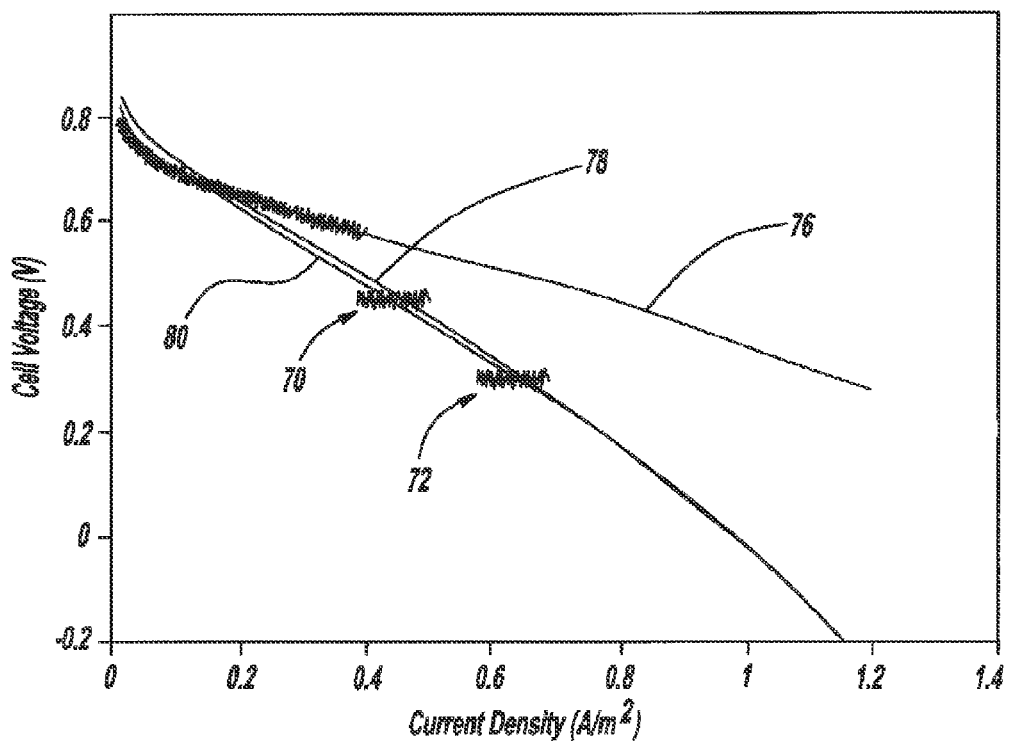
FIG. 5 is a graph with stack current density on the horizontal axis and cell voltage on the vertical axis showing the accuracy of a predicted minimum cell voltage trend.

For example, the minimum cell voltage may be triggered if one of the cells in the stack has a voltage of 0.45 volts and the corresponding current density is 0.8 A/cm$^2$. If yes, the stack health monitor indicates that a trigger has been hit and the stored average cell voltage data is overwritten in nearby bins at box 48. The data filled into the data bins for parameter estimation may be, for example, 0.45 volts as the minimum cell voltage for the current density range of 0.8±c where c can be a tuned parameter, as can be seen in FIG. 5, discussed below.

Overwriting data in the nearby bins at the box 48 helps to represent the minimum cell voltage at the predetermined trigger level, thereby enabling the algorithm to more accurately predict the parameter estimation, i.e., the minimum cell voltage trend and the minimum cell voltage polarization curve, which enables the controller 24 to set a desirable current set-point value for the fuel cell stack 20.

Once the first trigger level is achieved at the decision diamond 46, and the data is overwritten in the nearby bins at the box 48, the algorithm determines if a second threshold level trigger for a minimum cell voltage has been achieved at decision diamond 50. For example, the minimum cell voltage trigger for the second trigger level may be 0.30 volts and the corresponding current density may be 1.0 A/cm$^2$. If yes, the stack health monitor indicates that the second trigger has been hit and the stored average cell voltage data is overwritten in nearby bins at box 52, where the data filled into the data bins may be, for example, 0.30 volts as the minimum cell voltage for the current density range of 1.0±c, where c can be a tuned parameter, as shown in FIG. 5 and discussed below. If the second trigger level has not been achieved, the algorithm continues to collect average cell voltage and corresponding current density data at the box 44 and does not estimate parameters according to one embodiment. In an alternate embodiment, the parameter estimation may begin after the first trigger level is achieved, regardless of whether the second trigger level is achieved, as discussed in more detail below.

Once the first and second trigger levels have been achieved at the decision diamonds 46 and 50, respectively, and the data has been overwritten in the nearby bins at the boxes 48 and 52, respectively, the algorithm will verify that the data collected are sufficient to estimate the parameters of the stack 20. If the data are sufficient, the algorithm estimates the fuel cell system parameters, including the minimum cell voltage trend and a minimum cell voltage polarization curve, as shown in box 36 of FIG. 3. The parameter estimation at the box 36 utilizes the same equation for determining the minimum cell voltage polarization curve as the previously disclosed algorithm discussed above, however, the data utilized in the equation is different. In particular, the data overwritten in the nearby bins at the boxes 48 and 52 creates more data points near the first and second trigger levels, thus providing a more robust estimation of the polarization curve for the minimum cell voltage without requiring minimum cell voltage and current density data to be collected at every time step. A polarization curve for the minimum cell voltage is assumed to exist based on experimental data that shows a correlation between minimum cell voltage and change in current density.

FIG. 5 is a graph with stack current density on the horizontal axis and cell voltage on the vertical axis showing the artificial data points created according to the algorithm of the present invention. A cluster of data points 70 represents the artificially created data points that are overwritten in the nearby bins at the box 48, and a cluster of data points 72 represents the artificially created data points that are overwritten in the nearby bins at the box 52. Line 76 illustrates the estimated parameters according to the previously disclosed algorithm, discussed above, line 78 illustrates the estimated parameters according to the algorithm of the present invention, and line 80 illustrates experimental data. FIG. 5 shows that the algorithm of the invention accurately estimates the drop in cell voltage for the corresponding current density, that is, accurately estimates the trend in minimum cell voltage.

As discussed above, the parameters of the fuel cell system 18 may be estimated after the first trigger level has been achieved at the decision diamond 50, even if the second trigger level has not been achieved, if the data collected are sufficient by using the data overwritten in the nearby bins at the box 48 and then continuously collecting data regarding cell voltage and current density to capture dynamic changes that may affect the estimated parameters. To estimate stack parameters after the first trigger level has been achieved, the amount of data gathered must be sufficient, as determined by the current density range of the stack 20. Alternatively, the parameters of the fuel cell system 18 may be estimated after more than two trigger levels have been achieved, although not shown in FIG. 4 for the sake of clarity, and then continuously collecting data regarding average cell voltage and current density to capture dynamic changes that may affect the estimated parameters. More than two trigger levels typically implies that the data gathered is sufficient, as it is expected that the trigger levels will have varying current densities. Generally, the more trigger levels that are used, the more accurate the parameter estimation will be.

Once the parameter estimation is complete at the box 36, the parameter estimation is stored in non-volatile memory of the controller 24 at box 38. In addition, once the parameter estimation starts at the box 36, the algorithm will continuously predict the parameters based on the dynamic data input, as discussed above, including a minimum cell voltage trend and a minimum cell voltage polarization curve.

After the parameter estimation is complete at the box 36, the algorithm proceeds to box 38 to store the estimated parameters that are used to determine the polarization curves in non-volatile memory. In one non-limiting embodiment, a predetermined cell voltage model is used to determine the parameters as:

$$E_{cell} = E_{rev} - (i+a)*R_{HFR} - \left(0.07*\log_{10}\left(\frac{i+a}{i^0}\right) + c\log_{10}\left(1 - \frac{i}{i^\infty}\right)\right) \quad (1)$$

Where the Following Measurements are Provided:
$E_{cell}$=Cell voltage (V)
i=Current density (A/cm$^2$); and
$R_{HFR}$=Cell HFR resistance measurement or from model (ohm cm$^2$).
The Following Assumed Constants are Provided:
$E_{rev}$=Thermodynamic reversible cell potential (V); and
a=Background current density from Cell Shorting/Cell crossover (A/cm$^2$).
The Following Parameters are Provided:
$i^0$=Exchange current density (A/cm$^2$);
$i^\infty$=Limiting current density (A/cm$^2$); and
c=Mass transfer coefficient.

For a system with very repeatable membrane humidification control, $R_{HFR}$ might be represented as a function of current density. Similarly, $E_{rev}$ might also be represented as a function of current density. This suggests that at each current density, the operating pressure, temperature, stoichiometry and humidification are sufficiently repeatable to use a simplistic term. In another embodiment, the average $R_{HFR}$ could be either measured or calculated at each count, and averaged. The value $E_{rev}$ could be computed the same way, based on temperature and pressure data at each count.

The cell voltage model of equation (1) can be simplified by ignoring the constant a so that equation (1) becomes:

$$E_{cell} = E_{rev} - (i)*R_{HFR} - \left(0.07*\log_{10}\left(\frac{i}{i^0}\right) + c\log_{10}\left(1 - \frac{i}{i^\infty}\right)\right) \quad (2)$$

Rearranging the terms in equation (2) gives:

$$E_{rev} - (i)*R_{HFR} - E_{cell} = \left(0.07*\log_{10}\left(\frac{i}{i^0}\right) + c\log_{10}\left(1 - \frac{i}{i^\infty}\right)\right) \quad (3)$$

To provide the parameter estimation, the following variables are defined:

$y = E_{rev} - (i)*R_{HFR} - E_{cell}$ x=i $\theta_1 = i^0$ $\theta_2 = i^\infty$ $\theta_3 = c$ Equation (3) can be represented in the following form:

$y = F(x, \theta)$ (4)

Thus, equation (3) can be represented as:

$$y = \left(0.07 * \log_{10}\left(\frac{x}{\theta_1}\right) + \theta_3 \log_{10}\left(1 - \frac{x}{\theta_2}\right)\right) \quad (5)$$

In equation (5), the input-output pair is (x,y) and the parameters to be estimated are $\theta=[\theta_1,\theta_2,\theta_3]^T$.

For a given training set G=x(i),y(i):(i=1,2, . . . , M), a cost function to be minimized can be defined as:

$$J(\theta, G) = \frac{1}{2}\sum_{i=1}^{M} |y(i) - F(x(i), \theta)|^2 \quad (6)$$

By letting $\epsilon(i)=y(i)-F)(x(i),\theta)$, equation (6) becomes:

$$J(\theta, G) = \frac{1}{2}\sum_{i=1}^{M} \varepsilon(i)^T \varepsilon(i) = \frac{1}{2}\varepsilon(\theta, G)^T \varepsilon(\theta, G) \quad (7)$$

Therefore, the parameter estimation solves a non-linear least squares problem so that the solution $\theta=[\theta_1,\theta_2,\theta_3]^T$ minimizes $J(\theta,G)$.

The non-linear least squares problem can be solved using any suitable numerical method, such as a Gauss-Newton estimation with a Levenberg-Marquardt update method. The Gauss-Newton approach can be summarized by linearizing an error $\epsilon(\theta,G)$ at the current value of $\theta(k)$, where k is an iteration index, and solving the least squares problem to minimize the error value and estimate $\theta(k+1)$. In one embodiment, the computation is minimized by setting the value $\theta_2$ to a constant $\theta_c$ and estimating the other two parameters $\theta_1$ and $\theta_3$. However, this is by way of a non-limiting example in that all three of the parameters $\theta_1$, $\theta_2$ and $\theta_3$ can be estimated by the algorithm or any other suitable parameters.

In other embodiments, different techniques could be used to solve equation (7). For example, for stacks in which performance is insensitive to the parameter $i^\infty$, this parameter could be replaced with a constant. Then the parameters $i^0$ and c could be solved sequentially. The parameter $i^0$ could be solved by using data collected at low enough current density to minimize mass transport losses, but high enough to minimize the effect of permeation (0.05-0.1 A/cm$^2$). Then the resulting equation could be solved with the high current density data to obtain the parameter c.

The algorithm may also determine whether the estimated parameters provide or exceed a predetermined estimation success criteria (ESC). Particularly, in one non-limiting embodiment, the calculated parameters must satisfy the equation:

$$(\theta(k+1)-\theta(k))^T(\theta(k+1)-\theta(k)) \leq \omega\theta(k)^T\theta(k) \quad (8)$$

Where $\omega$ is a tunable parameter used to determine the steady state of the estimation.

Once the estimation of the parameters is complete at the box 36 as shown in FIG. 3, the algorithm stores the estimated parameters in a non-volatile random access memory (NV RAM) at the box 38, as discussed above. The controller 24 can then access the NV RAM to get the current estimation parameters, which can then be used to calculate the polarization curve in a manner that is well understood by those skilled in the art. Once the algorithm starts to estimate the parameters, it will continuously estimate based on the dynamic data input falling in the data bins such that artificial data points will be overwritten in the nearby bins, as discussed above, if the minimum cell voltage hits the trigger again. If the minimum cell voltage never achieves the trigger again, the estimated minimum cell voltage will be gradually close to the average cell voltage since average cell voltage values will dominate the data input. In addition, once the parameter estimation is complete at the box 36, a desired current set-point value for the fuel cell stack 20 may be determined. A detailed discussion of determining a current set-point value for the fuel cell stack 20 can be found in U.S. patent application Ser. No. 12/567,381, entitled, "Method to Improve Fuel Cell System Performance Using Cell Voltage Prediction of Fuel Cell Stack," assigned to the assignee of the present application and incorporated herein by reference.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for predicting a minimum cell voltage trend of fuel cells in a fuel cell stack, said method comprising:
   using a stack health monitor and a controller to perform the steps of:
   monitoring fuel cell stack voltage and current density of the fuel cell stack;
   determining an average cell voltage from the measured stack voltage based on the number of fuel cells in the stack;
   monitoring a minimum cell voltage of the cells in the stack;
   determining whether the minimum cell voltage falls below a first predetermined threshold value;
   generating a first set of artificial data points for a cell voltage proximate to the first threshold value if the minimum cell voltage falls below the first threshold value;
   determining whether the minimum cell voltage falls below a second predetermined threshold value, wherein the second predetermined threshold value is less than the first predetermined threshold value;
   generating a second set of artificial data points for a cell voltage proximate to the second threshold value if the minimum cell voltage falls below the second threshold value; and
   estimating fuel cell stack parameters based on the average cell voltage, the current density, and the first and second set of artificial data points so as to predict the minimum cell voltage trend and a minimum cell voltage polarization curve of the fuel cells in the stack.

2. The method according to claim 1 wherein generating the first set of artificial data points includes generating the first set of artificial data points within a predetermined current density range proximate to the first predetermined threshold value for the minimum cell voltage.

3. The method according to claim 1 wherein generating the second set of artificial data points includes generating the second set of artificial data points within a predetermined current density range proximate to the second predetermined threshold value for the minimum cell voltage.

4. The method according to claim 1 wherein estimating the fuel cell stack parameters is performed continuously after the estimation begins by using real-time average cell voltage and the corresponding current density data of the fuel cell stack.

5. The method according to claim 1 further comprising using a power limitation algorithm to integrate the estimated fuel cell stack parameters to prevent fuel cell voltage potential reversals from occurring.

6. The method according to claim 1 wherein monitoring minimum cell voltages, average cell voltages and current densities includes using a stack health monitor.

7. The method according to claim 1 wherein monitoring average cell voltages and current densities includes using a boost converter.

8. A method for predicting a minimum cell voltage trend of fuel cells in a fuel cell stack, said method comprising:
    using a stack health monitoring device and a controller to perform the steps of:
    measuring fuel cell stack voltage and current density of the fuel cell stack;
    determining an average fuel cell voltage from the measured stack voltage based on the number of fuel cells in the stack;
    measuring a minimum cell voltage of the fuel cells in the stack;
    determining whether the minimum cell voltage falls below a predetermined threshold value;
    generating artificial data points for a fuel cell voltage proximate to the predetermined threshold value if the minimum cell voltage falls below the predetermined threshold value;
    storing the average cell voltage, the current density and the artificial data points; and
    predicting the minimum cell voltage trend and a minimum cell voltage polarization curve from the stored average cell voltage, the current density and the artificial data points.

9. The method according to claim 8 wherein generating the artificial data points includes generating the artificial data points within a predetermined current density range proximate to the predetermined threshold value for the average cell voltage.

10. The method according to claim 8 further comprising estimating stack parameters using the stored average cell voltage, current density and the artificial data points when the amount of information stored is sufficient as determined by the current density range.

11. The method according to claim 10 wherein estimating the fuel cell stack parameters is performed continuously after the estimation begins by using real-time average cell voltage and the corresponding current density data from the fuel cell stack.

12. The method according to claim 11 wherein the estimated value of the minimum cell voltage from the real-time average cell voltage and the corresponding current density will gradually become closer to the average cell voltage and the corresponding current density if the fuel cell system does not achieve the predetermined threshold value after initially achieving the predetermined threshold value.

13. The method according to claim 8 wherein measuring minimum cell voltage, stack voltage and current density includes utilizing a stack health monitor.

14. The method according to claim 8 wherein measuring stack voltage and current density includes utilizing a boost converter.

15. A system for estimating parameters of a fuel cell stack, said system comprising:
    a stack health monitoring device for monitoring minimum cell voltage of the fuel cells in the stack, stack voltage and current density of the fuel cell stack, wherein the stack health monitor indicates when a predetermined minimum cell voltage threshold level has been achieved; and
    a controller configured to control the fuel cell stack, said controller determining and recording the average fuel cell voltage based on stack voltage and the number of fuel cells in the stack, said controller generating and storing artificial data points proximate to the one or more predetermined minimum cell voltage threshold levels each time the minimum cell voltage drops below the one or more predetermined minimum cell voltage threshold levels, as indicated by the stack health monitor, so as to provide an estimation of the fuel cell stack parameters including a minimum cell voltage trend and a minimum cell voltage polarization curve.

16. The system according to claim 15 wherein the controller estimates the fuel cell stack parameters once the amount of data gathered is sufficient as determined by the current density range.

17. The system according to claim 16 wherein the controller estimates the fuel cell stack parameters continuously after the estimation begins by using real-time average cell voltage and the corresponding current density data from the fuel cell stack.

18. The system according to claim 15 wherein the controller generates and stores the artificial data points within a predetermined current density range for each predetermined minimum voltage threshold level.

19. The system according to claim 15 wherein the controller includes a power limitation algorithm to prevent fuel cell voltage potential reversals from occurring.

20. The system according to claim 15 further comprising a boost converter for measuring the average fuel cell voltage and current density.

* * * * *